J. B. POWELL.
Gates for Railway Crossings.

No. 138,527. Patented May 6, 1873.

Witnesses:
Jacob E. Schiedt.
Harry M. Wiedersheim.

Inventor:
John B. Powell
by John A. Wiedersheim,
Atty.

J. B. POWELL.
Gates for Railway Crossings.
No. 138,527. Patented May 6, 1873.
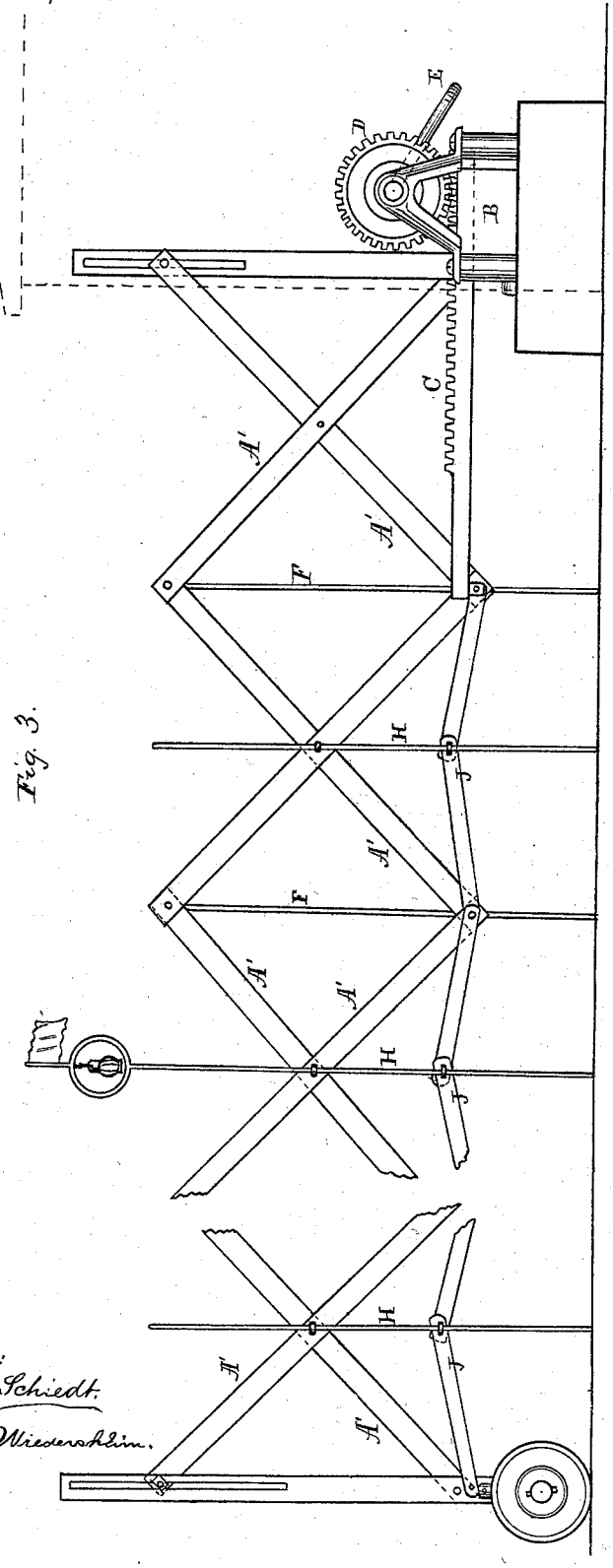

UNITED STATES PATENT OFFICE.

JOHN B. POWELL, OF PHILADELPHIA, PENNSYLVANIA, ASSIGNOR OF ONE-HALF HIS RIGHT TO EDGAR P. MICHENER, OF SAME PLACE.

IMPROVEMENT IN GATES FOR RAILWAY CROSSINGS.

Specification forming part of Letters Patent No. 138,527, dated May 6, 1873; application filed September 30, 1872.

*To all whom it may concern:*

Be it known that I, JOHN B. POWELL, of the city and county of Philadelphia and State of Pennsylvania, have invented a new and useful Improvement in Gates for Railroad Crossings and other purposes; and I do hereby declare the following to be a clear and exact description of the nature thereof, sufficient to enable others skilled in the art to which my invention appertains to fully understand and use the same, reference being had to the accompanying drawing making part of this specification, in which—

Figure 1:
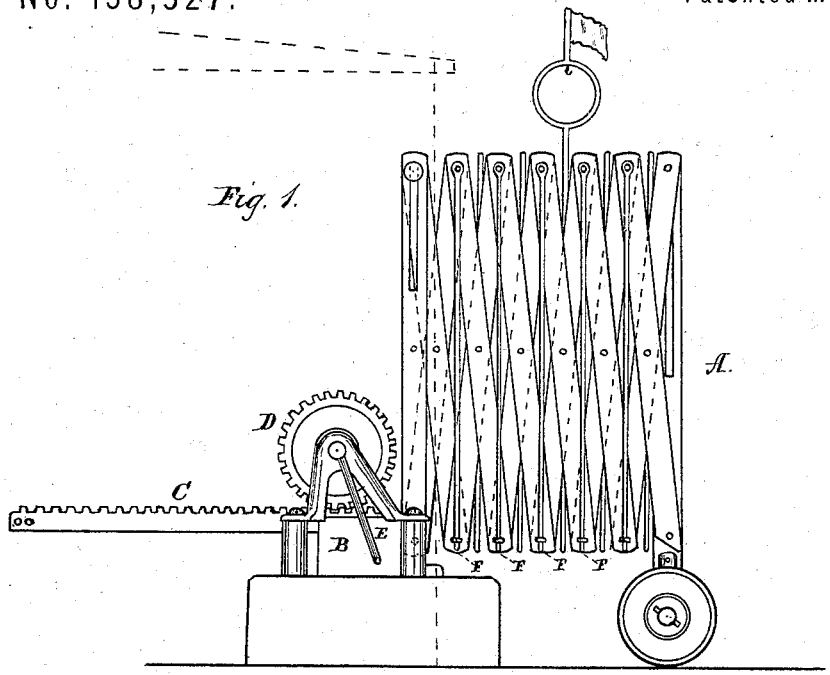
Figure 2:
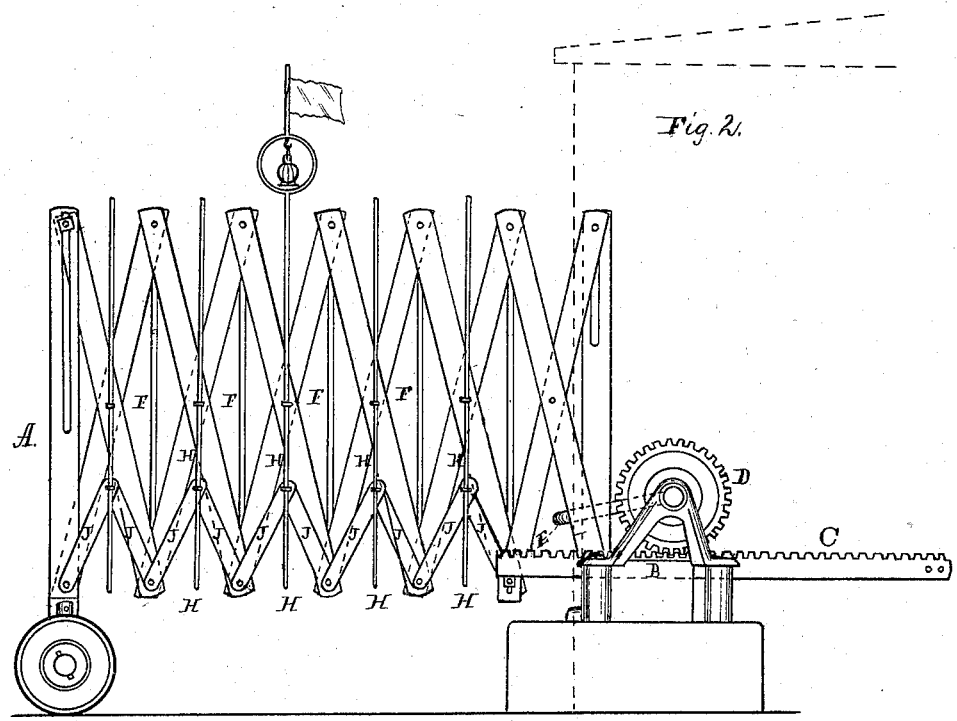

The Figures 1, 2, and 3 are front views of the gate, respectively, opened, closed, and partly opened, as illustrative of my invention. Fig. 4 is a bottom view.

Similar letters of reference indicate corresponding parts in the several figures.

This invention relates to gates adapted for crossings of railroads, &c., which require to be opened and closed hastily; and consists in mechanism for conveniently operating the gate. It also consists in rods for bracing or stiffening and supporting the gate and closing the spaces between the gate and ground. It also consists in additional means for bracing or stiffening and supporting the gate and closing spaces between the gate and ground.

Referring to the drawing, A represents the gate, which consists of a series of crossed levers, bars, or slats, A', jointed to each other after the manner of the well-known lazy-tongs, in which a motion at one end will give a greater motion to the other end.

This gate more especially is to be arranged in streets and roads at the crossings of railroads and other dangerous places, and is designed as a barricade or obstacle to the passage of pedestrians, vehicles, and animals at times when there is danger from the approaching or passing train. On such occasions the gate must move swiftly, easily, and reliably; and, unless it possesses these advantages, it is not serviceable. The means of operation of the gate must be within convenient reach of the man at the crossing, and, as he is generally provided with a box as a place of shelter and rest, it is desirable that the gate may be opened and closed from said box.

The operating or stationary end of the gate, which is properly jointed to a block, post, or bed, B, and an upright thereon, arranged at one side of the street or road, has attached to one of its joints a rack, C, which passes through the bed B, and above the latter there is mounted a pinion or toothed wheel, D, which meshes with the rack-bar, and is provided with a crank or other handle, E, for convenient manipulation.

It is not necessary that the bed should be located in the box of the man of the crossing, for, if the handle E only is within convenient reach, the gate can be readily opened and closed, the operation requiring but little space.

It is evident that a small movement of the pinion will impart a greater movement to the gate, so that a few quick rotations will spread and fold the gate, whereby the operation of opening and closing is performed with swiftness and slight expenditure of power. Owing to the simplicity of parts, the gate will work surely, and with but little liability to fracture and breakage.

The free end of the gate will be mounted on wheels or rollers to prevent catching or dropping of said end, the wheels or rollers moving in grooves or tracks properly laid on the ground; but the main portion of the gate will be somewhat subjected to bowing. To prevent this I suspend from the upper joints of the sections of the crossed bars A' vertical rods F, whose free ends are at the bottom of the gate, and pass through eyes or other guides G located at or near the lower joints of the respective cross-bars. As the gate opens, the upper and lower ends of the bars approach each other, and as the upper ends of the rods F move with the respective portions of the bars, the said ends are depressed, and, when to their full extent, rest on the ground, thus supporting the main portion of the gate, and obstructing the space between the gate and ground. In addition thereto, said rods serve to stiffen the gate, inasmuch as they are connected to the upper and lower ends of the jointed sections of the crossed bars, so that the gate will be sufficiently braced, and withstand the continual and severe usage to which it will be subjected. In order to more fully brace the gate, I arrange on the side thereof opposite to the rods F a series of rods, H, which pass through eyes at the middle joints of the crossed bars, and are attached to toggle-levers J at the joints thereof. These levers have their ends jointed to the lower ends of the crossed bars, and their central joints are above said lower ends of the crossed bars, so that the toggles fold upwardly and unfold downwardly.

When the gate is extended or shut, the crossed bars, separating, open the toggle-levers, and thus draw down the rods H, and, when to their full extent, rest on the ground, thus assisting the rods F to support the main portion of the gate, and closing the spaces between the rods F between the gate and ground, besides serving to brace and strengthen the gate.

It will be seen that the rods F and H alternate with each other, and, when they rest on the ground, form a wide base for the extended bars for steadily supporting the gate—a result not attainable if said rods were on the same side or in the same right-line.

The toggle-levers close or fold when the gate is drawn in or open, thus elevating the rods H clear of the ground, and permitting them to gather with the crossed bars.

The central rod H will have attached to it the signal-light and flag, which will occupy such conspicuous positions that there will be no difficulty in observing whether the gate is closed or open, especially at night-time.

It will be perceived that, when the gate is folded, all parts may be readily carried together or transported without the necessity of separating the parts, the gate being thereby portable and always in condition to be located and operated.

Having thus described my invention, what I claim as new, and desire to secure by Letters Patent, is—

1. In combination with the gate A, constructed of jointed bars A' operating after the manner of lazy-tongs, the rack-bar C and operating-pinion D, applied and adapted substantially as and for the purpose set forth.

2. The rods F, combined and operating with the jointed bars A', substantially in the manner and for the purpose specified.

3. The rods H and toggle-levers J combined and operating with the jointed bars A', substantially as and for the purpose set forth.

4. The combination, with the gate A, of the rods F on one side thereof, and the rods H and toggle-levers J on the other side thereof, and operating together, as set forth.

To the above I have signed my name this 25th day of September, 1872.

JOHN B. POWELL.

Witnesses:
JOHN A. WIEDERSHEIM,
WM. JAMES.